United States Patent
Ouyang et al.

(10) Patent No.: US 10,416,386 B2
(45) Date of Patent: Sep. 17, 2019

(54) PHOTONIC CRYSTAL ALL-OPTICAL ANTI-INTERFERENCE SELF-LOCKING TRIGGER SWITCH

(71) Applicant: Zhengbiao Ouyang, Shenzhen, Guangdong (CN)

(72) Inventors: Zhengbiao Ouyang, Guangdong (CN); Quanqiang Yu, Guangdong (CN)

(73) Assignee: Zhengbiao Ouyang, Shenzhen (CN)

( * ) Notice: Subject to any disclaimer, the term of this patent is extended or adjusted under 35 U.S.C. 154(b) by 241 days.

(21) Appl. No.: 15/626,253

(22) Filed: Jun. 19, 2017

(65) Prior Publication Data
US 2017/0293075 A1    Oct. 12, 2017

Related U.S. Application Data

(63) Continuation of application No. PCT/CN2015/097843, filed on Dec. 18, 2015.

(30) Foreign Application Priority Data

Dec. 19, 2014 (CN) .......................... 2014 1 0804542

(51) Int. Cl.
 *G02B 6/125* (2006.01)
 *G02F 3/00* (2006.01)
 (Continued)

(52) U.S. Cl.
 CPC ........... *G02B 6/125* (2013.01); *G02B 6/1225* (2013.01); *G02B 6/355* (2013.01); *G02F 1/365* (2013.01);
 (Continued)

(58) Field of Classification Search
 CPC ........ G02F 3/00; G02F 1/365; G02F 2201/06; G02F 2202/32; G02B 6/1223; G02B 6/1225; G02B 6/125
 See application file for complete search history.

(56) References Cited

U.S. PATENT DOCUMENTS

2006/0062507 A1    3/2006 Yanik et al.

FOREIGN PATENT DOCUMENTS

JP    09288288 A   * 11/1997
JP    H09288288 A    11/1997

OTHER PUBLICATIONS

International Search Report of PCT Patent Application No. PCT/CN2015/097843 dated Mar. 11, 2016.

* cited by examiner

*Primary Examiner* — Robert E. Tallman
(74) *Attorney, Agent, or Firm* — Zhihua Han (57) ABSTRACT

The present invention discloses a photonic crystal all-optical anti-interference self-locking trigger switch which includes a photonic crystal structure unit, an optical switch, an absorbing load and an internal or external reference light source, wherein said photonic crystal structure unit includes two signal-input ends, a signal-output end; a first input end of said photonic crystal structure unit is connected to a logic signal X; the input end of the optical switch is connected with the reference light source, the first intermediate signal-output end of the optical switch is connected with the second input end of the photonic crystal structure unit, and the second intermediate signal-output end of the optical switch is connected with the wave absorbing load. The present invention has the advantages of high contrast of high and low logic output, high computing speed, strong anti-interference capability, and ease of integration with other optical logic elements.

14 Claims, 5 Drawing Sheets

(51) Int. Cl.
  *G02B 6/122* (2006.01)
  *G02F 1/365* (2006.01)
  *G02B 6/35* (2006.01)
  *B82Y 20/00* (2011.01)
  *G02B 6/12* (2006.01)
(52) U.S. Cl.
  CPC ................ *G02F 3/00* (2013.01); *B82Y 20/00* (2013.01); *G02B 2006/1213* (2013.01); *G02B 2006/12145* (2013.01); *G02F 2202/32* (2013.01)

| A | B | C | Y |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |
| 1 | 1 | 0 | 1 |
| 1 | 1 | 1 | 1 |

FIG.5

PHOTONIC CRYSTAL ALL-OPTICAL ANTI-INTERFERENCE SELF-LOCKING TRIGGER SWITCH

CROSS-REFERENCE TO RELATED APPLICATION

This application is a continuation application of PCT Application No. PCT/CN2015/097843 filed on Dec. 18, 2015, which claims priority to Chinese Patent Application No. 201410804542.4 filed on Dec. 19, 2014, the entire contents of which are hereby incorporated by reference.

FIELD OF THE INVENTION

The present invention relates generally to a two-dimensional (2D) photonic crystal (PhC) and optical anti-interference self-locking trigger switch.

BACKGROUND OF THE INVENTION

In 1987, the concept of PhC was proposed separately by E. Yablonovitch from United States Bell Labs who discussed how to suppress spontaneous radiation and by S. John from Princeton University who made discussions about photonic localization. PhC is a material structure in which dielectric materials are arranged periodically in space, and is usually an artificial crystal including of two or more materials having different dielectric constants.

With the emergence of and in-depth research on PhC, people can control the motion of photons in a PhC material more flexibly and effectively. In combination with traditional semiconductor processes and integrated circuit technologies, design and manufacture of PhC and devices thereof have continually and rapidly marched towards all-optical processing, and PhC has become a breakthrough for photonic integration. In December 1999. PhC was recognized by the American influential magazine *Science* as one of the top ten scientific advances in 1999, and therefore has become a hot topic in today's scientific research field.

An all-optical logic device mainly includes an optical amplifier-based logic device, a non-linear loop mirror logic device, a Sagnac interference type logic device, a ring cavity logic device, a multi-mode interference logic device, an optical waveguide coupled logic device, a photoisomerized logic device, a polarization switch optical logic device, a transmission grating optical logic device, etc. These optical logic devices have the common shortcoming of large size in developing large-scale integrated optical circuits. With the improvement of science and technology in recent years, people have also done research and developed quantum optical logic devices, nano material optical logic devices and PhC optical logic devices, which all conform to the dimensional requirement of large-scale photonic integrated optical circuit. For modern manufacturing processes, however, the quantum optical logic devices and the nano material optical logic devices are very difficult to be manufactured, whereas the PhC optical logic devices have competitive advantages in terms of manufacturing process.

In recent years. PhC logic devices have become a hot area of research drawing widespread attentions, and it is highly likely for them to replace the current widely-applied electronic logic devices in the near future.

In the process of realizing all-optical computing. PhC logical function devices based on "AND", "OR", "NOT". "XOR" and the like have been successfully designed and researched, and various complex logic components are still needed for achieving the goal of all-optical computing.

SUMMARY OF THE INVENTION

The present invention is aimed at overcoming the defects of the prior art and providing an all-optical anti-interference self-locking trigger switch Simple in structure, strong in anti-interference capability and easy to integrate with other optical logic elements.

In order to solve the above technical problems, the present invention adopts the following technical solution:

A PhC all-optical anti-interference self-locking trigger switch in the present invention includes a PhC structure unit, an optical switch, a wave absorbing load and an internal or external reference-light source, wherein the PhC structure unit is included of two signal-input port, a signal-output port; the first input port of the PhC structure unit is connected to a logic signal X; the input port of the optical switch is connected with the reference-light source, the first intermediate signal-output port of the optical switch is connected with the second input port of the PhC structure unit, the second intermediate signal-output port of the optical switch is connected with the wave absorbing load.

The PhC structure unit is a 2D PhC cross-waveguide nonlinear cavity, twelve high-refractive-index linear-dielectric rectangular pillars and one nonlinear-dielectric square pillar are arranged in a center of the 2D PhC cross-waveguide nonlinear cavity in an form of a quasi-one-dimensional (1D) PhC along longitudinal and transverse waveguide directions, the central nonlinear-dielectric pillar clings to four adjacent high-refractive-index linear-dielectric rectangular pillars, the central dielectric pillar is made of a Kerr shape nonlinear material, and has a dielectric constant of 7.9 under low light conditions, the second high-refractive-index linear-dielectric rectangular pillar has a dielectric constant consistent with that of a dielectric pillar under low light conditions.

The high-refractive-index linear-dielectric pillars of the nonlinear cavity unit constitute the 2DPhC cross intersected waveguide four-port network, two mutually-orthogonal quasi-1DPhC structures are placed in two waveguide directions crossed at the center of across waveguide, an dielectric pillar is arranged in an middle of the cross waveguide, the dielectric pillar is made of a nonlinear material, and the quasi-1DPhC structures and the dielectric pillar constitute a waveguide defect cavity.

The PhC is a (2k+1)×(2k+1) array structure, where k is an integer more than or equal to 3.

The optical switch is a 1×2 optical gating switch, and includes a reference-light input port, a control input port, a first intermediate signal-output port and a second intermediate signal-output port.

A cross section of the high-refractive-index linear-dielectric pillar of the 2D PhC is circular, elliptic, triangular or polygonal.

The dielectric pillar in the quasi-1DPhCof the cross waveguide has a refractive index of 3.4 or a different value more than 2.

The cross section of the central dielectric pillar is square, polygonal, circular or elliptic.

The cross section of the dielectric pillar in the quasi-1D PhC of the cross waveguide is rectangular, polygonal circular or elliptic.

A background filling material for the 2D PhC includes air or a different low-refractive-index dielectric having a refractive index less than 1.4.

Compared with the prior art, the present invention has the advantages:

1. The PhC logic device can directly carry out all-optical logic functions of "AND", "OR". "NOT" and the like, is a core device for realizing all-optical computing, and compact in structure, high in computing speed, the high and low logic output contrast is high, and quick in response.

2. Strong in anti-interference capability and easy to integrate with other optical logic elements.

3. The PhC all-optical logic device of the present invention has a self-locking trigger switch function, and can eliminate interference signals.

These and other objects and advantages of the present invention will become readily apparent to those skilled in the art upon reading the following detailed description and claims and by referring to the accompanying drawings.

BRIEF DESCRIPTION OF THE DRAWINGS

In FIG. 1, indications are: PhC structure unit 01, first signal-input port 11, second signal-input port 12, idle port 13, output port 14, high-refractive-index linear-dielectric circular pillar 15, first high-refractive-index linear-dielectric rectangular pillar 16, second high-refractive-index linear-dielectric rectangular pillar 17, nonlinear-dielectric pillar 18, optical switch 02, wave absorbing load 03, an reference-light source 04, controlling reference-light E, logic signal X, control signal K

The present invention is more specifically described in the following paragraphs by reference to the drawings attached only by way of example.

DETAILED DESCRIPTION OF THE EMBODIMENTS

The terms a or an, as used herein, are defined as one or more than one. The term plurality, as used herein, is defined as two or more than two. The term another, as used herein, is defined as at least a second or more.

Figure 1:
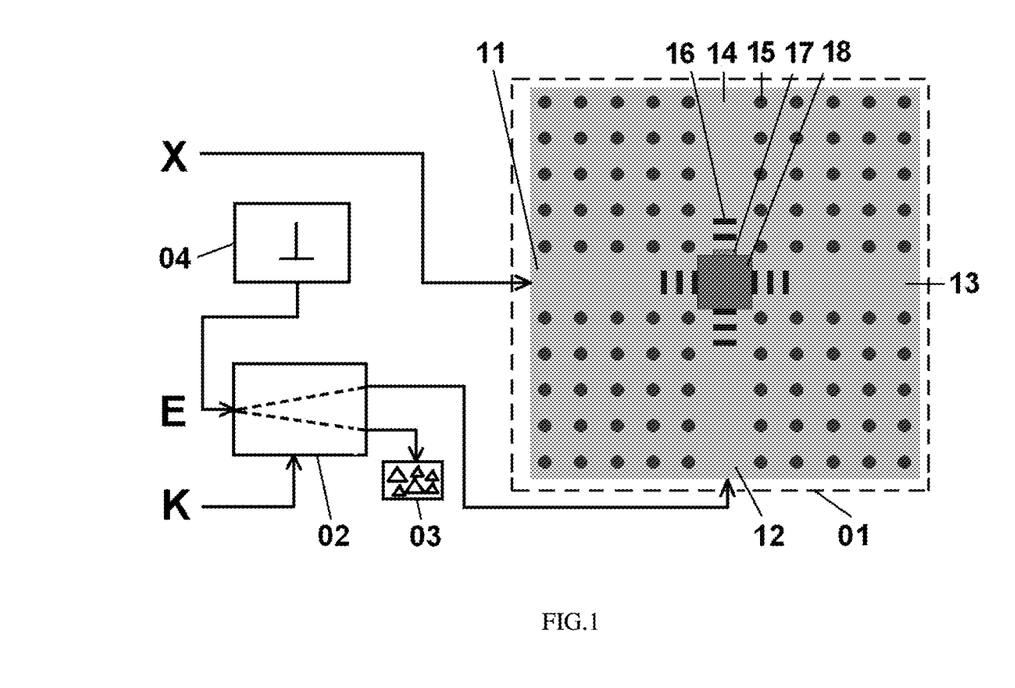
FIG. 1 shows a structural diagram of a PhC all-optical anti-interference self-locking trigger switch of the present invention.

Referring to FIG. 1, a PhC all-optical anti-interference self-locking trigger switch includes a PhC structure unit 01, an optical switch 02, a wave absorbing load 03 and an internal or external reference-light source 04, wherein the PhC structure unit 01 is included of a first signal-input port 11, a second signal-input port 12, a signal-output port 14 and an idle port 13, the PhC structure unit 01 is a 2D PhC cross-waveguide nonlinear cavity, the lattice constant of the 2DPhC array is d, and the array number is 11×11; the high-refractive-index linear-dielectric circular pillar 15 is made of a silicon (Si) material, and has a refractive index of 3.4 and a radius of 0.18d: the first high-refractive-index linear-dielectric rectangular pillar 16 has a refractive index of 3.4, long sides of 0.613d and short sides of 0.162d; the second high-refractive-index linear-dielectric rectangular pillar 17 has a dielectric constant consistent with that of a dielectric pillar 18 under low light conditions, and has a dimension equal to that of the first high-refractive-index linear-dielectric rectangular pillar 16; and the cross section of the central dielectric pillar 18 is made of a Kerr type nonlinear material, and has a side length of 1.5d, a dielectric constant of 7.9 under low light conditions and a third-order nonlinear coefficient of $1.33 \times 10^{-2}$ $\mu m^2/V^2$. Twelve high linear-dielectric rectangular pillars and one nonlinear-dielectric square pillar are arranged in the center of the 2D PhC cross-waveguide nonlinear cavity in the form of a quasi-1D PhC along longitudinal and transverse waveguide directions, the central nonlinear-dielectric pillar clings to the four adjacent linear-dielectric rectangular pillars and the distance there between is 0, every two adjacent linear-dielectric rectangular pillars are spaced 0.2668d from each other, the high-refractive-index linear-dielectric pillars are constituted by a 2D PhC cross-waveguide four-port network, two mutually-orthogonal quasi-1D PhC structures are placed in two waveguide directions crossed at the center of across waveguide, an dielectric pillar is arranged in the middle of the cross waveguide, the intermediate dielectric pillar is made of a nonlinear-dielectric pillar, and the quasi-1D PhC structures and the dielectric pillar constitute a waveguide defect cavity.

The optical switch 02 is a 1×2 optical gating switch, and includes a reference-light input port, a control input port, a first intermediate signal-output port and a second intermediate signal-output port, wherein the first intermediate signal-output port of the optical switch 02 is connected with the second input port 12 of the PhC structure unit 01, the second intermediate signal-output port of the optical switch 02 is connected with the wave absorbing load 03 and a control signal K of the optical switch is used for controlling reference-light E to be output from the first intermediate signal-output port or the second intermediate signal-output port; the reference-light source 04 is connected with the input port of the optical switch 02; an internal or external wave absorbing load 03 is used for absorbing light wave entering it, an internal or external reference-light source 04, and a logic signal X is connected to the first input port 11 of the PhC structure unit 01.

The present invention based on the photonic bandgap characteristic, quasi-1D PhC defect state, tunneling effect and optical Kerr nonlinear effect of the 2D PhC cross-waveguide nonlinear cavity shown by 01 of FIG. 1, the function of the all-optical anti-interference self-locking trigger switch can be realized by relevant unit devices such as the optical switch and cooperation of the control signal K. Introduced first is the basic principle of the PhC nonlinear cavity in the present invention: a 2D PhC provides a photonic bandgap with certain bandwidth, a light wave with its wavelength falling into this bandgap can be propagated in an optical circuit designed inside the PhC, and the operating wavelength of the device is thus set to certain wavelength in the photonic bandgap; the quasi-1D PhC structure arranged in the center of the cross waveguide and the nonlinear effect of the central dielectric pillar together provide a defect state mode, which, as the input light wave satisfies certain light intensity, shifts to the operating frequency of the system, so that the structure produces the tunneling effect and signals are output from the output port 14.

Figure 2:
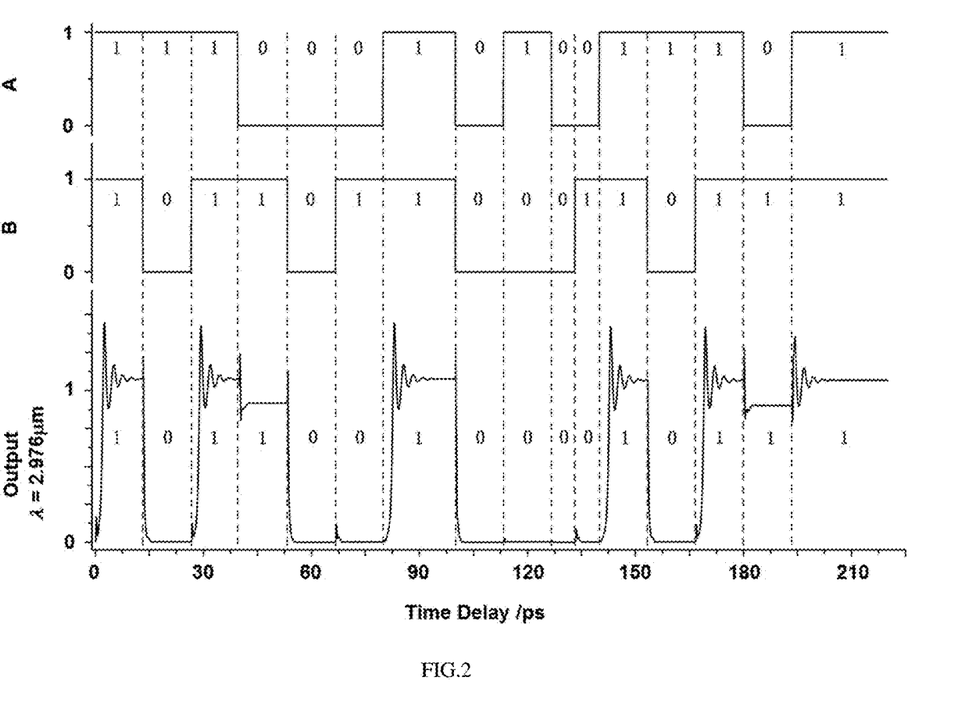
FIG. 2 is a waveform diagram of a basic logic function of the PhC structure unit shown in FIG. 1 for the lattice constant d of 1 μm and the operating wavelength of 2.976 μm.
Figure 5:
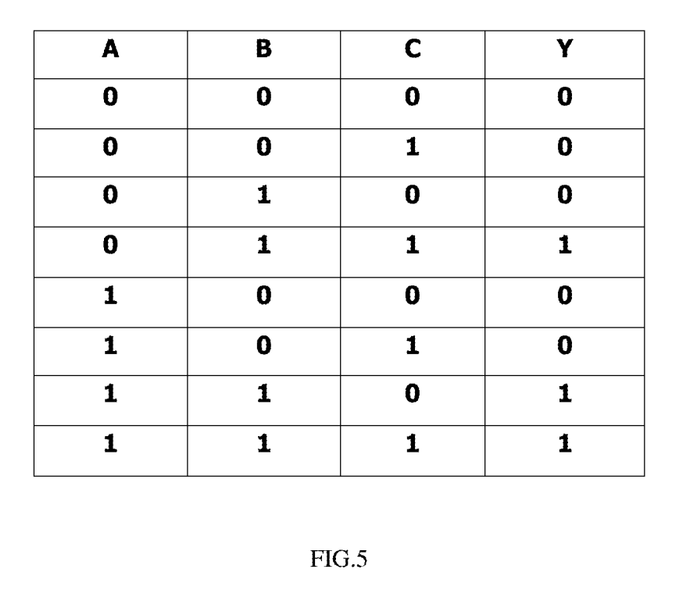
FIG. 5 is a truth table of logic functions of the 2D PhC cross-waveguide nonlinear cavity shown in FIG. 1.

For the lattice constant d of 1 μm and the operating wavelength of 2.976 μm, referring to the 2D PhC cross-waveguide nonlinear cavity 01 shown in FIG. 1, as a signal A is input from the first signal-input port 11 and a signal B is input from the second signal-input port 12 with the signal waveforms by the upper two diagrams indicated in FIG. 2, a logic output waveform diagram of the 2D PhC nonlinear cavity unit 01 of the present invention can be obtained, as shown by the lower diagram in FIG. 2. A logic operation truth table of the structure shown in FIG. 1 can be obtained according to the logic operation characteristic shown in FIG. 2, as indicated in FIG. 5. In FIG. 5, C is current state $Q^n$, and Y is signal output of the output port (of the nonlinear cavity unit), i.e., next state $Q^{n+1}$. A logic expression of the nonlinear cavity unit can be obtained according to the truth table.

$$Y=AB+BC \quad (1)$$

That is $$Q^{n+1}=AB+BQ^n \quad (2)$$

An all-optical anti-interference self-locking trigger switch function can be realized by the control of the control signal K according to the basic logic characteristic of said 2D PhC cross-waveguide nonlinear cavity under the cooperation of relevant unit devices.

The PhC structure of the device of the present invention is a $(2k+1)\times(2k+1)$ array structure, where k is an integer more than or equal to 3. Design and simulation results will be provided below in an embodiment given in combination with the accompanying drawings, wherein the embodiment is exemplified by an 11×11 array structure, and design and simulation results are given, taking the lattice constant d of the 2DPhC array being 1 μm and 0.5208 μm respectively as an example.

The anti-interference self-locking trigger switch:
In formula (2), supposing B=0, leading to:

$$Q^{n+1}=0 \quad (3)$$

In formula (2), supposing B=1, leading to:

$$Q^{n+1}=A+Q^n \quad (4)$$

It can be seen from the above two formulas that for B=0, no matter the input signal A of the first port 11 is set to 0 or 1, the output 14 of the system is always 0; for B=1, the output of the system is related to the input signal A of the first port 11 and the current state $Q^n$; it is not difficult to discover that when the current state $Q^n$ is equal to 0, the output 14 of the system is equal to the input signal A of the first port 11, but once the input signal A is set to 1, the system will lock the output of high logic 1.

It can be known from the above logic characteristic that the device of the present invention has an anti-interference self-locking trigger switch function.

As shown in FIG. 1, the logic signal X is input from the first input port 11; the reference-light signal is E, and E=1; and the control signal of the system is K.

As K=0, the optical switch 02 gates the input signal and outputs it from the second intermediate signal output port, i.e., the reference-light E is input to the wave absorbing load 03. Thus, no signal is output from the first intermediate signal output port of the optical switch 02, the input signal B of the second input port 12 of the PhC structure unit 01 is equal to K and equal to 0, and it can be obtained from formula (2):

$$Q^{n+1}=0 \quad (5)$$

At the moment, no matter the input signal A=X of the first port 11 is a 0 or 1 setting signal, the output 14 of the system is zero. Thus, the control signal K=0 is a zero setting control signal of the system, and the anti-interference self-locking trigger switch is at a zero clearing stage.

For K=1, the optical switch 02 gates the input signal and outputs it from the first intermediate signal output port, i.e., the reference-light E is input to the second input port 12 of the PhC structure unit 01, and the input signal B of the second input port 12 is equal to E and equal to 1; the input signal A of the first port 11 is equal to X, and it can be obtained from formula (2):

$$Q^{n+1}=X+Q^n \quad (6)$$

At the moment when the control signal K is set to 1 from 0, the current state $Q^n$ in formula (4) is equal to 0, and the output 14 of the system is $$Q^{n+1}=X \quad (7)$$

Before next zero setting control signal arrives, once an "1" setting signal appears at the signal X, no matter how the later signal X changes, the output of the system is not disturbed by the signal X but locks the output of high lock level "1", $$Q^{n+1}=1 \quad (8)$$

Thus, the control signal K=1 is a normal operating signal of the anti-interference self-locking trigger switch, i.e., a self-locking trigger operating signal.

Figure 3:
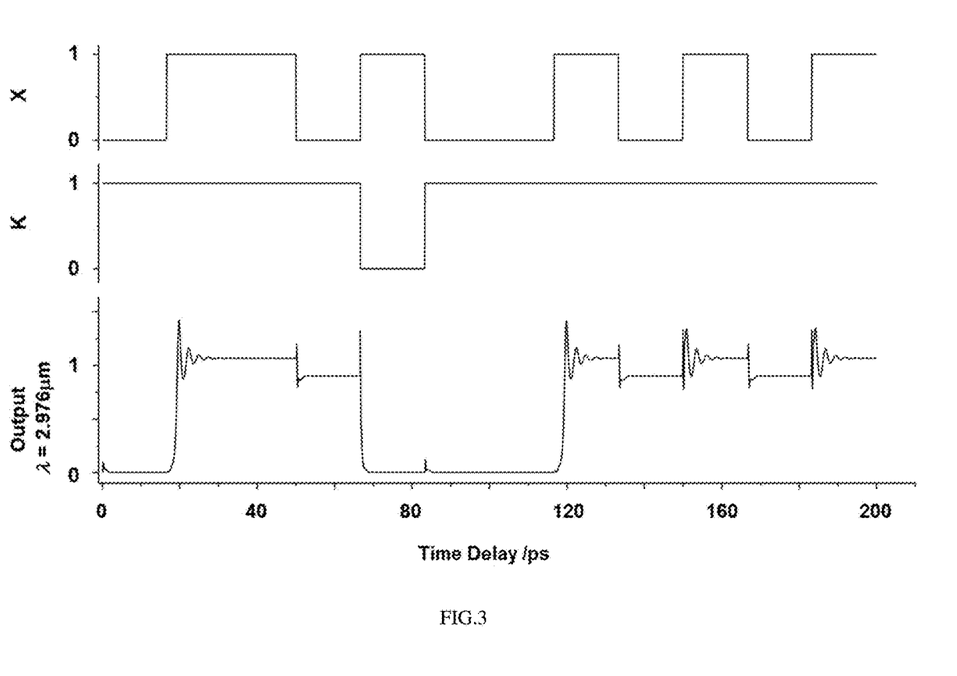
FIG. 3 is a waveform diagram of logic function of the present invention for the lattice constant d of 1 μm and the operating wavelength of 2.976 μm.
Figure 4:
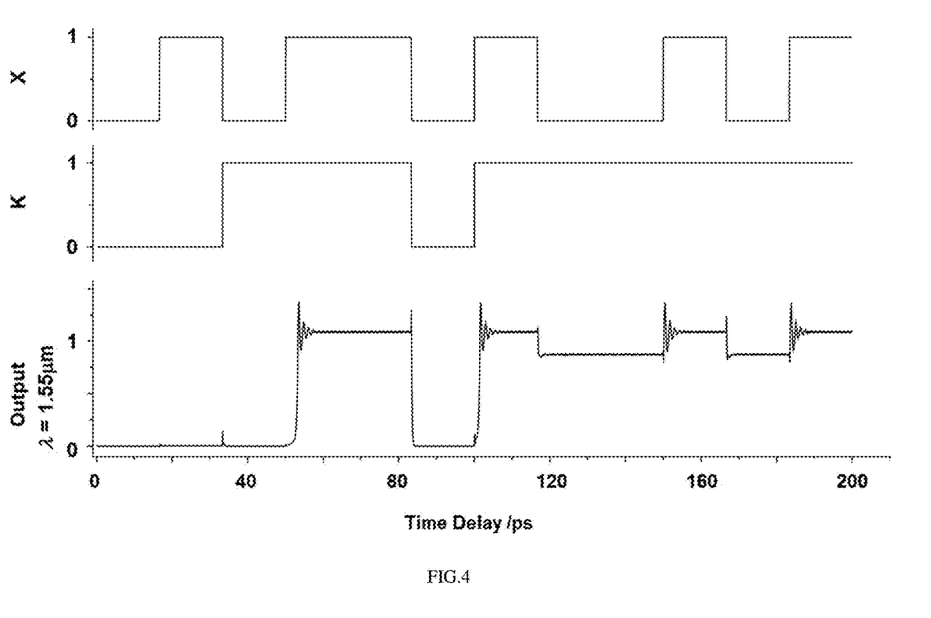
FIG. 4 is a waveform diagram of logic function of the present invention for the lattice constant d of 0.5208 μm and the operating wavelength of 1.55 μm.

FIG. 3 and FIG. 4 show logic function waveform diagrams of the all-optical anti-interference self-locking trigger switch realized under the conditions that the lattice constant d is 1 μm and the operating wavelength is 2.976 μm as well as the lattice constant d is 0.5208 μm and the operating wavelength is 1.55 μm respectively. Hence, the system is reset for K=0, and is in a normal operating state for K=1. The device of the present invention can realize the same logic function by scaling under different lattice constants and corresponding operating wavelengths in combination with FIG. 3 and FIG. 4.

To sum up, the device of the present invention can realize an all-optical anti-interference self-locking trigger switch function by one control signal K in combination with FIG. 3 and FIG. 4.

While the invention has been described in terms of various specific embodiments, those skilled in the art will recognize that the invention can be practiced with modification within the spirit and scope of the claims.

What is claimed is:

1. A photonic crystal (PhC) all-optical anti-interference self-locking trigger switch, comprising:
    a PhC structure unit, an optical switch, a wave absorbing load and a reference-light source;
    the PhC structure unit is a two-dimensional (2D) PhC cross-waveguide nonlinear cavity, comprising:
    one or more high refractive-index linear-dielectric pillars constitute the 2D PhC cross-intersected waveguide four-port network, a square nonlinear-dielectric pillar is arranged in an middle of a cross-waveguide, twelve rectangular high-refractive-index linear-dielectric pillars d one square nonlinear-dielectric pillar are arranged in a center of the 2D PhC cross-waveguide nonlinear cavity in a form of a quasi-one-dimensional (quasi-1D) PhC along longitudinal direction in a vertical waveguide and transverse direction in a horizontal waveguide;
    the PhC structure unit further comprising:
    two signal-input end, a signal-output end; a first input end of said PhC structure unit is connected to a logic signal; the input end of the optical switch is connected with the reference-light source, a first intermediate signal-output end of the optical switch is connected with a second input end of the PhC structure unit, and a second intermediate signal-output end of the optical switch is connected with the wave absorbing load.

2. The PhC all-optical anti-interference self-locking trigger switch in accordance with claim 1, the square nonlinear-dielectric pillar clings to four adjacent rectangular high-refractive-index linear-dielectric pillars; the square nonlinear-dielectric pillar is Kerr type nonlinear material, and has a dielectric constant of 7.9 under weak light conditions; and the twelve rectangular high-refractive-index linear-dielectric pillars have a dielectric constant consistent with that of the square nonlinear-dielectric pillar under weak light conditions.

3. The PhC all-optical anti-interference self-locking trigger switch in accordance with claim 1, wherein two mutually-orthogonal quasi-1D PhC structures are placed along longitudinal direction in a vertical waveguide and transverse direction in a horizontal waveguide crossed at a center of the cross-waveguide; the square nonlinear-dielectric pillar s nonlinear material, and the quasi-1D PhC structures and the square nonlinear-dielectric pillar constitute a waveguide defect cavity.

4. The PhC all-optical anti-interference self-locking trigger switch in accordance with claim 1, wherein said PhC is a (2k+1)*(2k+1) array structure, where k is an integer more than or equal to 3.

5. The PhC all-optical anti-interference self-locking trigger switch in accordance with claim 1, wherein said optical switch is a 1×2 optical gating switch, and includes a reference-light input end, a control input end, a first intermediate signal-output end and a second intermediate signal-output end.

6. The PhC all-optical anti-interference self-locking trigger switch in accordance with claim 1, wherein a cross section of the high-refractive-index linear-dielectric pillar of the 2D PhC is circular, elliptic, triangular, or polygonal.

7. The PhC all-optical anti-interference self-locking trigger switch in accordance with claim 1, wherein a cross section of a rectangular high-refractive-index linear-dielectric pillar of the cross-waveguide is polygonal, circular, or elliptic.

8. The PhC all-optical anti-interference self-locking trigger switch in accordance with claim 1, wherein a cross section of a rectangular high-refractive-index linear-dielectric pillar of the cross-waveguide is rectangular.

9. The PhC all-optical anti-interference self-locking trigger switch in accordance with claim 1, wherein a rectangular high-refractive-index linear-dielectric pillar of the cross-waveguide has a refractive index of value more than 2.

10. The PhC all-optical anti-interference self-locking trigger switch in accordance with claim 1, wherein a rectangular high-refractive-index linear-dielectric pillar of the cross-waveguide has a refractive index of 3.4.

11. The PhC all-optical anti-interference self-locking trigger switch in accordance with claim 1, wherein a cross section of the square nonlinear-dielectric pillar is polygonal, circular, or elliptic.

12. The PhC all-optical anti-interference self-locking trigger switch in accordance with claim 1, wherein a cross section of the square nonlinear-dielectric pillar is square.

13. The PhC all-optical anti-interference self-locking trigger switch in accordance with claim 1, wherein a background filling material for the 2D PhC is a low-refractive-index dielectric having a refractive index less than 1.4.

14. The PhC all-optical anti-interference self-locking trigger switch in accordance with claim 1, wherein a background filling at for the 2D PhC is air.

* * * * *